United States Patent
Fidaleo et al.

(10) Patent No.: US 12,547,820 B2
(45) Date of Patent: Feb. 10, 2026

(54) AUTOMATED GENERATION OF COMMENTATOR-SPECIFIC SCRIPTS

(71) Applicant: Disney Enterprises, Inc., Burbank, CA (US)

(72) Inventors: Douglas A. Fidaleo, Canyon Country, CA (US); Jon Hayes Snoddy, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 51 days.

(21) Appl. No.: 17/674,355

(22) Filed: Feb. 17, 2022

(65) Prior Publication Data

US 2023/0259693 A1 Aug. 17, 2023

(51) Int. Cl.
*G06F 40/166* (2020.01)
*G06F 40/30* (2020.01)
*G06N 3/006* (2023.01)

(52) U.S. Cl.
CPC ............ *G06F 40/166* (2020.01); *G06F 40/30* (2020.01); *G06N 3/006* (2013.01)

(58) Field of Classification Search
CPC ............................... G06F 40/166; G06F 40/30
See application file for complete search history.

(56) References Cited

U.S. PATENT DOCUMENTS

| 2013/0346886 | A1* | 12/2013 | Cauchois | H04L 51/046 |
| | | | | 715/758 |
| 2021/0294977 | A1* | 9/2021 | Soryal | G06F 40/30 |
| 2022/0038790 | A1* | 2/2022 | Duan | H04N 21/234336 |
| 2022/0108068 | A1* | 4/2022 | Datla | G06N 3/044 |
| 2023/0125543 | A1* | 4/2023 | Santhar | G06F 16/345 |
| | | | | 704/260 |

* cited by examiner

*Primary Examiner* — Sherrod L Keaton

(74) *Attorney, Agent, or Firm* — Artegis Law Group, LLP

(57) ABSTRACT

A system includes a computing platform having processing hardware and a memory storing a software code. The processing hardware is configured to execute the software code to receive input data from a user, determine, using the input data, an intent of the user and a commentator persona for providing a commentary to the user, and obtain, based on the input data, content data for use in the commentary. The processing hardware is further configured to execute the software code to generate, based on the intent of the user and using the content data, a script for the commentary, transform the script, using the commentator persona, to a commentator-specific script for the commentary, and output the commentary to the user, using the commentator-specific script.

18 Claims, 6 Drawing Sheets

AUTOMATED GENERATION OF COMMENTATOR-SPECIFIC SCRIPTS

BACKGROUND

A characteristic feature of human communication is variety of expression. For example, when one person comments on an event to another, a number of different expressions may be used despite the fact that a bland factual recitation would provide an accurate description of the event in almost every instance. Instead, a human commentator may select expressions based on their enthusiasm for the subject matter, as well as whether the person receiving the commentary is a child, a teenager, or an adult. Although advances in artificial intelligence have led to the development of devices providing conversational interfaces that simulate social agents, those interfaces typically project a single synthesized persona that tends to lack character and naturalness. In addition, the conversational interfaces provided by the conventional art are primarily transactional and become interactive only in response to affirmative requests by a user.

In order for a non-human social agent to engage in a realistic interaction with a user, it is desirable that the non-human social agent project a characteristic persona and be capable of varying its form of expression in a seemingly natural way that is consistent with its persona. That is to say, a typical shortcoming of conventional social agents is their inability to engage in natural, fluid interactions that project a distinct personality type. Moreover, although existing social agents offer some degree of user personalization, for example tailoring responses to an individual user's characteristics or preferences, that personalization remains limited by their fundamentally transactional design.

DETAILED DESCRIPTION

Figure 1:
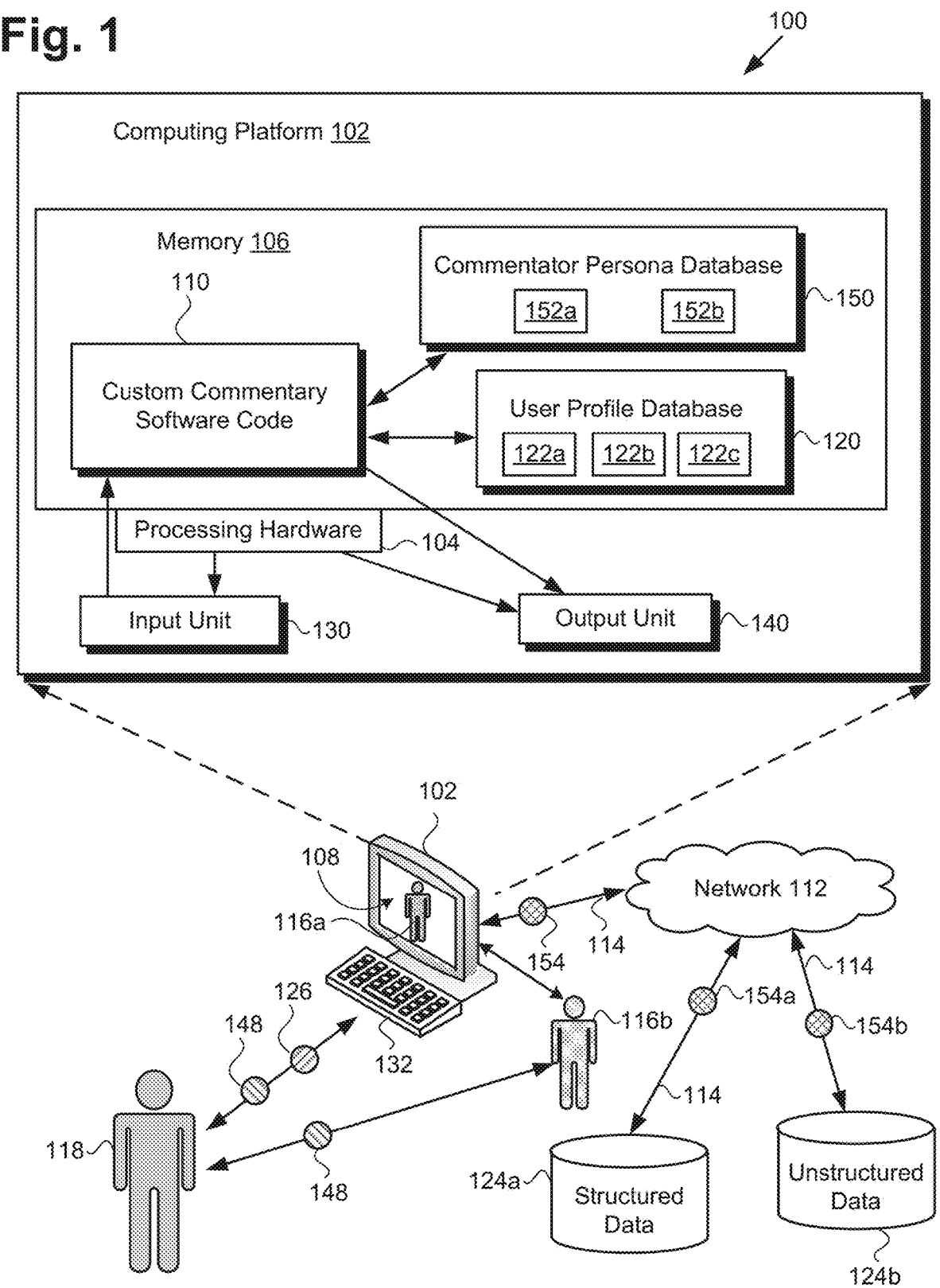
FIG. 1 shows a diagram of a system for automating generation of commentator-specific scripts, according to one exemplary implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals.

As stated above, a characteristic feature of human communication is variety of expression. For example, when one person comments on an event to another, a number of different expressions may be used despite the fact that a bland factual recitation would provide an accurate description of the event in almost every instance. Instead, a human commentator may select expressions based on their enthusiasm for the subject matter, as well as whether the person receiving the commentary is a child, a teenager, or an adult. Although advances in artificial intelligence have led to the development of devices providing conversational interfaces that simulate social agents, those interfaces typically project a single synthesized persona that tends to lack character and naturalness. In order for a non-human social agent to provide entertaining enjoyable commentary to a user, it is desirable that the non-human social agent project a personality (hereinafter "commentator persona") and be capable of varying its form of expression in a seemingly natural way that is consistent with that commentator persona. Consequently, there is a need in the art for an automated approach to generating commentator-specific scripts for use by different commentator personas each having a characteristic pattern of expression that can be adapted in real-time based on one or more of the age, gender, and preferences of a human listener, as well as on the nature of the subject matter being commented on.

The present application is directed to systems and methods for automating generation of commentator-specific scripts. The inventive concepts disclosed in the present application advantageously enable the automated determination of naturalistic expressions for use by a social agent in providing commentary to a user. In some implementations, such commentator-specific scripts may be user intent driven, or personalized and user intent driven.

It is noted that, as defined in the present application, a "commentator-specific script" refers a set of instructions for providing commentary based on an intent of the user receiving the commentary, a commentator persona to be projected by the system delivering the commentary, and in some implementations, a sentiment of the user. In addition, "user-commentator-specific script" refers a set of instructions for providing commentary further based on information relating to the user, such as one or more of the age, gender, or express or inferred preferences of the user, or the anticipated future actions of the user.

As defined in the present application, the term "intent" refers to a goal oriented psychological state of a human user and is distinguishable from "sentiment." which is defined to be the present psychological state of the human user. Examples of the types of goals determining intent include the acquisition of information, engaging in supportive dialogue, or engaging in debate, to name a few. Examples of sentiment may include partisanship, favoritism, impartiality, dislike, or opposition, to name a few. Furthermore, because it is not possible to have definite knowledge of a human user's inner mental state, as used in the present application the terms "intent" and "sentiment" are to be interpreted as intent and sentiment that is either expressly identified by the user, or as inferred intent and inferred sentiment. Thus, as used herein, the "intent of the user" refers to the "expressed or inferred intent of the user" and the "sentiment of the user" refers to the "expressed or inferred sentiment of the user."

It is further noted that, as defined in the present application, the feature "commentator persona" refers to a template or other representative model providing an exemplar for the expressiveness of a human person or fictional character. That is to say, a commentator persona may be affirmatively associated with some characteristic or idiosyncratic personality and communicative traits while being dissociated from others. For example, a commentator persona may be one or more of sarcastic, irreverent, knowledgeable, deferential, agreeable, profane, argumentative, or comedic. In addition, or alternatively, a particular commentator persona may be identified with a distinctive prosody. It is noted that as used in the present application the term "prosody" has its customary meaning in the art. Thus, prosody refers to the patterns of stress and intonation in speech, and may include loudness, pitch, timbre, cadence, the speed with which the speech is delivered, and the like.

It is also noted that, as defined in the present application, the feature "commentary" may include speech, such as a statement, question, or dialogue, or to non-verbal expressions. Moreover, "non-verbal expression" may refer to vocalizations that are not language based, i.e., non-verbal vocalizations, as well as to facial expressions, gestures, and physical postures. Examples of non-verbal vocalizations may include a sigh, a murmur of agreement or disagreement, or a giggle, to name a few.

As defined in the present application, the terms "automation," "automated," and "automating" refer to systems and processes that do not require human intervention. Although in some implementations a human editor may review the commentator-specific or user-commentator-specific scripts generated by the systems and using the methods described herein, that human involvement is optional. Thus, the methods described in the present application may be performed under the control of hardware processing components of the disclosed automated systems.

In addition, as defined in the present application, the term "social agent" refers to a non-human communicative entity rendered in hardware and software that is designed to provide commentary to a human user, which may include dialogue with the human user. In some use cases, a social agent may take the form of a virtual character rendered to a display, or may be manifested by sound emitted by an audio speaker. In other use cases, a social agent may be instantiated by a machine, such as a robot for example. Alternatively, a social agent may be implemented as an automated voice response (AVR) system, or an interactive voice response (IVR) system, for example.

FIG. 1 shows a diagram of system 100 for automating generation of commentator-specific scripts, according to one exemplary implementation. As shown in FIG. 1, system 100 includes computing platform 102 having processing hardware 104, input unit 130 including input device 132, output unit 140 including display 108, and memory 106 implemented as a non-transitory storage medium. According to the present exemplary implementation, memory 106 stores custom commentary software code 110, user profile database 120 storing user profiles 122a. 122b, and 122c (hereinafter "user profiles 122a-122c"), and commentator persona database 150 storing commentator personas 152a and 152b. In addition, FIG. 1 shows social agents 116a and 116b, which, in various implementations may be instantiated by or may receive commentary from, system 100.

It is noted that although FIG. 1 shows user profile database 120 as storing three user profiles 122a-122c, that exemplary depiction is provided merely in the interests of conceptual clarity. More generally, user profile database 120 may store more than three user profiles, such as hundreds, thousands, or millions of user profiles, for example. Each of user profiles 122a-122c may be specific to a single user of system 100. For instance, user profile 122a may be the user profile of user 118 and may include an interaction history of user 118 with system 100, past events participated in or attended by user 118, anticipated future actions by user 118, such as planned attendance at a future event for example. In addition, user history 122a of user 118 may include personal preferences of user 118, such as political affiliation, liked or disliked sports teams or movies, liked or disliked media personalities, and the like. However, it is emphasized that the user profile data retained in user profile database 120 is exclusive of personally identifiable information (PI) of user 118 or any other user of system 100.

It is further noted that although FIG. 1 shows user commentator persona database 150 as storing to commentator personas 152a and 152b, that exemplary depiction is also provided merely in the interests of conceptual clarity. More generally, commentator persona database 150 may store more than two commentator personas, such as dozens, hundreds, or thousands of commentator personas, for example. It is also noted that while in some implementations, commentator personas may be predetermined and fixed, in other implementations, system 100 may enable user 118 to modify one or more of commentator personas 152a or 152b, or to create one or more of commentator personas 152a or 152b.

As further shown in FIG. 1, system 100 is implemented within a use environment including communication network 112 providing network communication links 114, database 124a including structured data, database 124b including unstructured data, and user 118 interacting with system 100. Also shown in FIG. 1 are input data 126 provided by user 118, content data 154 in the form of one or more of structured data 154a obtained from database 124a and unstructured data 154b obtained from database 124b, and commentary 148, which may be provided to user 118 using a commentator-specific or user-commentator-specific script generated by custom commentary software code 110, executed by processing hardware 104.

Although the present application may refer to custom commentary software code 110, user profile database 120, and commentator persona database 150 as being stored in memory 106 for conceptual clarity, more generally, memory 106 may take the form of any computer-readable non-transitory storage medium. The expression "computer-readable non-transitory storage medium," as defined in the present application, refers to any medium, excluding a carrier wave or other transitory signal that provides instructions to processing hardware 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts custom commentary software code 110, user profile database 120, and commentator persona database 150 as being co-located in memory 106, that representation is also merely provided as an aid to conceptual clarity. More generally, system 100 may include one or more computing platforms 102, such as computer servers for example, which may be co-located, or may form an interactively linked but distributed system, such as a cloud-based system, for instance. As a result, processing hardware 104 and memory 106 may correspond to distributed processor and memory resources within system 100.

Processing hardware 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as custom commentary software code 110, from memory 106, while a GPU may be implemented to reduce the processing overhead of the CPU by performing computationally intensive graphics or other processing tasks. A TPU is an application-specific integrated circuit (ASIC) configured specifically for artificial intelligence (AI) applications such as machine learning modeling.

It is noted that, as defined in the present application, the expression "machine learning model" or "ML model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or neural networks (NNs). Moreover, a "deep neural network," in the context of deep learning, may refer to an NN that utilizes multiple hidden layers between input and output layers, which may allow for learning based on features not explicitly defined in raw data. It is further noted that, in some implementations, custom commentary software code 110 may include one or more ML models.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. Furthermore, in some implementations, system 100 may be implemented virtually, such as in a data center. For example, in some implementations, system 100 may be implemented in software, or as virtual machines. Consequently, in some implementations, commentary software code 110, user profile database 120, and commentator persona database 150 may be stored remotely from one another on the distributed memory resources of system 100.

Alternatively, when implemented as a personal computing device, computing platform 102 may take the form of a desktop computer, as shown in FIG. 1, or any other suitable mobile or stationary computing system that implements data processing capabilities sufficient to support connections to communication network 112, provide a user interface, and implement the functionality ascribed to computing platform 102 herein. For example, in other implementations, computing platform 102 may take the form of a laptop computer, tablet computer, or smartphone, for example, providing display 108. Display 108 may take the form of a liquid crystal display (LCD), a light-emitting diode (LED) display, an organic light-emitting diode (OLED) display, a quantum dot (QD) display, or a display using any other suitable display technology that performs a physical transformation of signals to light.

It is also noted that although FIG. 1 shows input unit 130 as including input device 132, output unit 140 as including display 108, and both input unit 130 and output unit 140 as residing on computing platform 102, those representations are merely exemplary as well. In other implementations including an all-audio interface, for example, input unit 130 may be implemented as a microphone, while output unit 140 may take the form of a speaker. Moreover, in implementations in which social agent 116$b$ takes the form of a robot or other type of machine, input unit 130 and output unit 140 may be integrated with social agent 116$b$ rather than with computing platform 102. In other words, in some implementations, social agent 116$b$ may include input unit 130 and output unit 140.

Figure 2A:
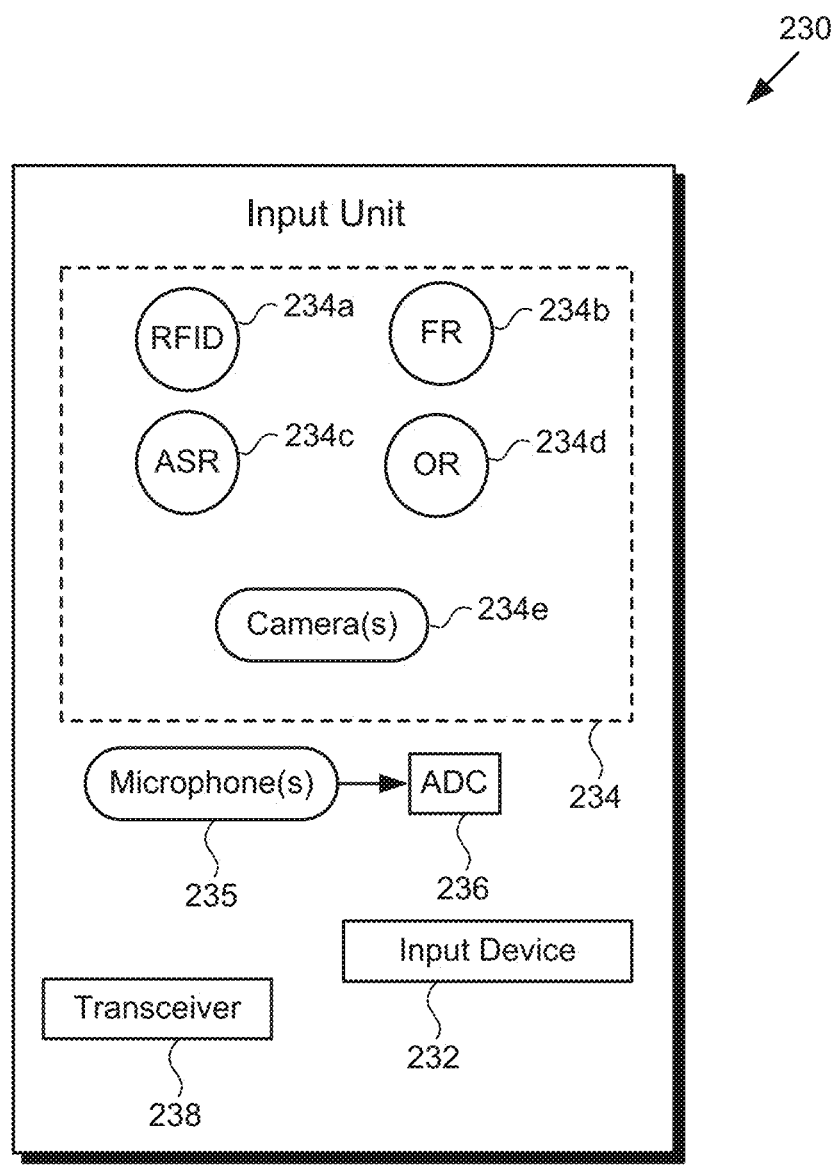
FIG. 2A shows a more detailed diagram of an input unit suitable for use in the system of FIG. 1, according to one implementation.

FIG. 2A shows a more detailed diagram of input unit 230 suitable for use in system 100, in FIG. 1, according to one implementation. As shown in FIG. 2A, input unit 230 may include input device 232, sensors 234, one or more microphones 235 (hereinafter "microphone(s) 235"), analog-to-digital converter (ADC) 236, and may also include transceiver 238. As further shown in FIG. 2A, sensors 234 of input unit 230 may include radio-frequency identification (RFID) sensor 234$a$, facial recognition (FR) sensor 234$b$, automatic speech recognition (ASR) sensor 234$c$, object recognition (OR) sensor 234$d$, and one or more cameras 234$e$ (hereinafter "camera(s) 234$e$"). Input unit 230 and input device 232 correspond respectively in general to input unit 130 and input device 132, in FIG. 1. Thus, input unit 130 and input device 132 may share any of the characteristics attributed to respective input unit 230 and input device 232 by the present disclosure, and vice versa.

It is noted that the specific sensors shown to be included among sensors 234 of input unit 130/230 are merely exemplary, and in other implementations, sensors 234 of input unit 130/230 may include more, or fewer, sensors than RFID sensor 234$a$, FR sensor 234$b$. ASR sensor 234$c$, OR sensor 234$d$, and camera(s) 234$e$. Moreover, in other implementations, sensors 234 may include a sensor or sensors other than one or more of RFID sensor 234$a$, FR sensor 234$b$, ASR sensor 234$c$. OR sensor 234$d$, and camera(s) 234$e$. It is further noted that camera(s) 234$e$ may include various types of cameras, such as red-green-blue (RGB) still image and video cameras. RGB-D cameras including a depth sensor, and infrared (IR) cameras, for example.

When included as a component of input unit 130/230, transceiver 238 may be implemented as a wireless communication unit enabling computing platform 102 or social agent 116$b$ to obtain content data 154 from one or more of databases 124$a$ and 124$b$ via communication network 112 and network communication links 114. For example, transceiver 238 may be implemented as a fourth generation (4G) wireless transceiver, or as a 5G wireless transceiver. Alternatively, or in addition, transceiver 238 may be configured to communicate via one or more of WiFi, Bluetooth, ZigBee, and 60 GHz wireless communications methods.

Figure 2B:
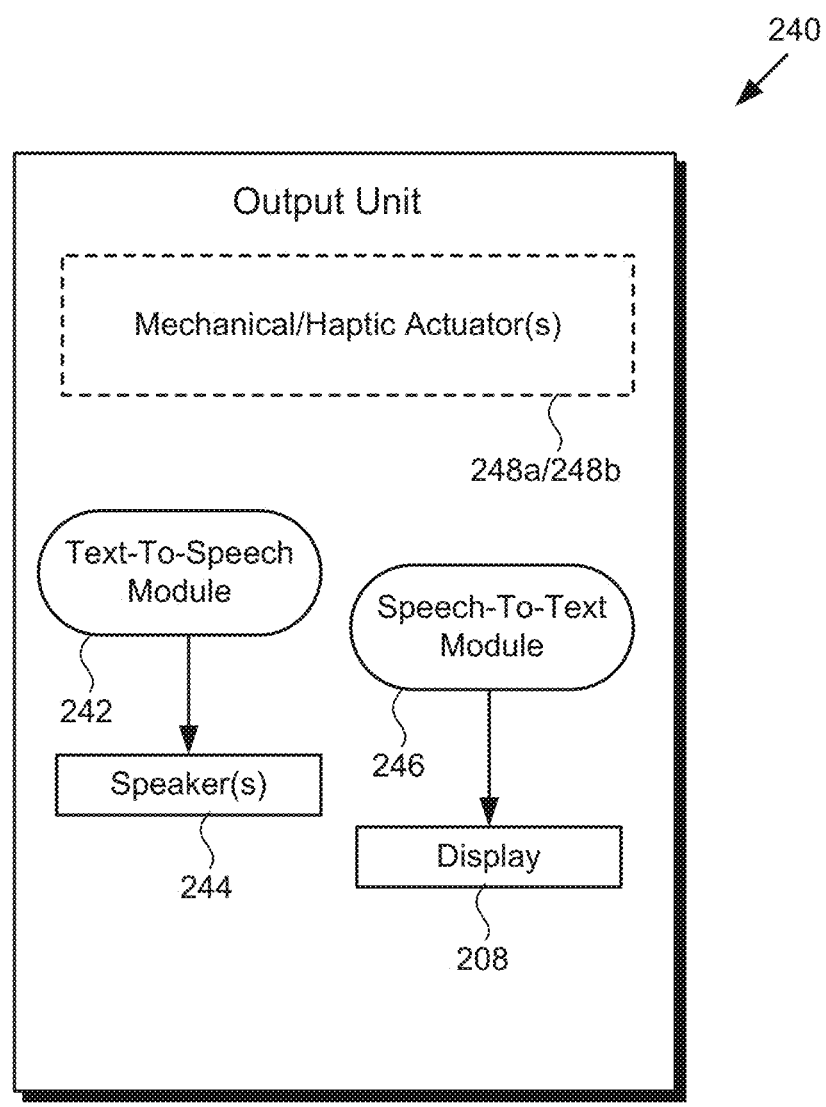
FIG. 2B shows a more detailed diagram of an output unit suitable for use in the system of FIG. 1, according to one implementation.

FIG. 2B shows a more detailed diagram of output unit 240 suitable for use in system 100, in FIG. 1, according to one implementation. As shown in FIG. 2B, output unit 240 includes display 208, Text-To-Speech (TTS) module 242, one or more audio speakers 244 (hereinafter "audio speaker(s) 244") and Speech-To-Text (STT) module 246. As further shown in FIG. 2B, in some implementations, output unit 240 may include one or more mechanical and haptic actuators 248 (hereinafter "mechanical/haptic actuator(s) 248"). It is noted that, when included as a component or components of output unit 240, mechanical/haptic actuator(s) 248 may be used to produce facial expressions by social agent 116*b*, to assume physical postures by social agent 116*b*, and to articulate one or more limbs or joints of social agent 116*b*. Output unit 240 and display 208 correspond respectively in general to output unit 140 and display 108, in FIG. 1. Thus, output unit 140 and display 108 may share any of the characteristics attributed to respective output unit 240 and display 208 by the present disclosure, and vice versa.

It is noted that the specific components shown to be included in output unit 140/240 are merely exemplary, and in other implementations, output unit 140/240 may include more, or fewer, components than display 108/208, TTS module 242, audio speaker(s) 244. STT module 246, and mechanical/haptic actuator(s) 248. Moreover, in other implementations, output unit 140/240 may include a component or components other than one or more of display 108/208, TTS module 242, audio speaker(s) 244, SST module 246, and mechanical/haptic actuator(s) 248.

Figure 3:
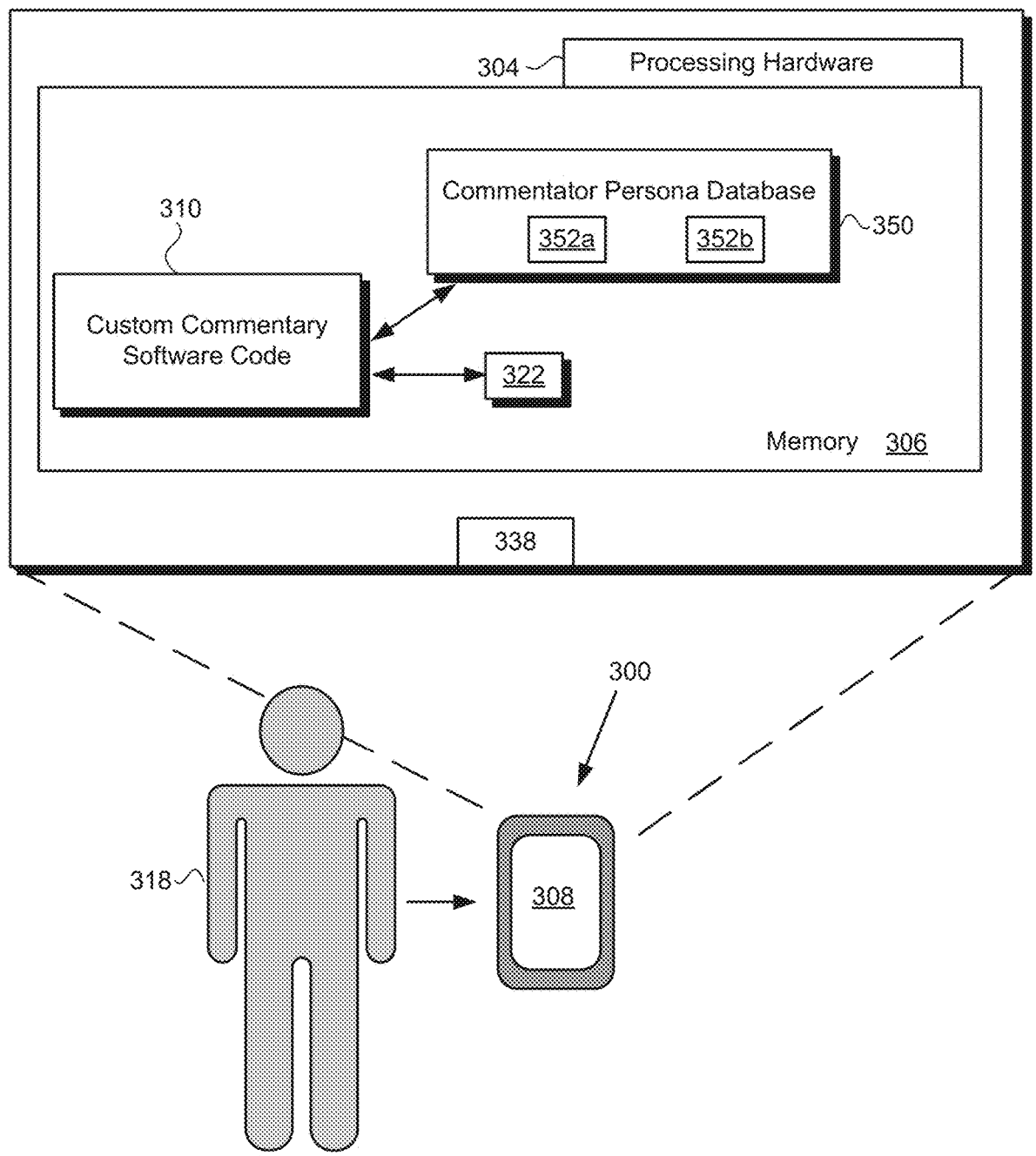
FIG. 3 shows an exemplary system for automating generation of commentator-specific scripts, according to another implementation.

FIG. 3 shows an exemplary system for automating generation of commentator-specific scripts, according to another implementation. As shown in FIG. 3, user system 300 is shown as a mobile device of user 318. As further shown in FIG. 3, user system 300 includes processing hardware 304, memory 306 implemented as a non-transitory storage medium, display 308, and transceiver 338. According to the exemplary implementation shown in FIG. 3, memory 306 stores custom commentary software code 310, commentator persona database 350 including commentator personas 352*a* and 352*b*, and user profile 322 of user 318.

Although depicted as a smartphone or tablet computer in FIG. 3, in various implementations, user system 300 may take the form of any suitable mobile computing system that implements data processing capabilities sufficient to provide a user interface, and implement the functionality ascribed to user system 300 herein. For example, in other implementations, user system 300 may take the form of a smartwatch or other smart wearable device providing display 308.

In some implementations, user system 300 may correspond in general to system 100, in FIG. 1. In those implementations, user system 300 may share any of the characteristics attributed to respective system 100 by the present disclosure, and vice versa. Thus, although not shown in FIG. 3, like system 100, user system 300 may include features corresponding respectively to input unit 130/230, input device 132, and output unit 140/240. Moreover processing hardware 304, memory 306, display 308, and transceiver 338, in FIG. 3, correspond respectively in general to processing hardware 104, memory 106, display 108, and transceiver 138, in FIG. 1. Thus, processing hardware 304, memory 306, display 308, and transceiver 338 may share any of the characteristics attributed to respective processing hardware 104, memory 106, display 108, and transceiver 138 by the present disclosure, and vice versa.

In addition, commentator persona database 350 including commentator personas 352*a* and 352*b*, in FIG. 3, corresponds in general to commentator persona database 150 including commentator personas 152*a* and 152*b*, in FIG. 1, while user 318 and user profile 322 correspond respectively in general to user 118 any one of user profiles 122*a*-122*c*. That is to say, commentator persona database 350 including commentator personas 352*a* and 352*b* may share any of the characteristics attributed to commentator persona database 150 including commentator personas 152*a* and 152*b* by the present disclosure, and vice versa, while user 318 and user profile 322 may share any of the characteristics attributed to respective user 118 and user profiles 122*a*-122*c*.

It is noted that in some implementations, custom commentary software code 310 may be a thin client application of custom commentary software code 110 that enables user 318 to provide input data 126 to system 100 for processing, and to receive commentary 148 for rendering to output unit 140/240 including audio speaker(s) 244 and display 108/208/308. However, in other implementations, custom commentary software code 310 may include substantially all of the features and functionality of custom commentary software code 110. Thus, in some implementations, user system 300 may perform substantially all of the actions attributed to system 100 herein.

According to the exemplary implementation shown in FIG. 3, custom commentary software code 310 and commentator persona database 350 are located in memory 306 of user system 300, subsequent to transfer of custom commentary software code 310 and commentator persona database 350 to user system 300 over a packet-switched network, such as the Internet, for example. Once present on user system 300, custom commentary software code 310 and commentator persona database 350 may be persistently stored in memory 306, and custom commentary software code 310 may be executed locally on user system 300 by processing hardware 304.

One advantage of local retention and execution of custom commentary software code 310 on user system 300 in the form of a mobile device of user 318 is that any personally identifiable information (PII) or other sensitive personal information of user 318 stored on user system 300 may be sequestered on the mobile device in the possession of user 318 and be unavailable to system 100 or other external agents.

Figure 4:
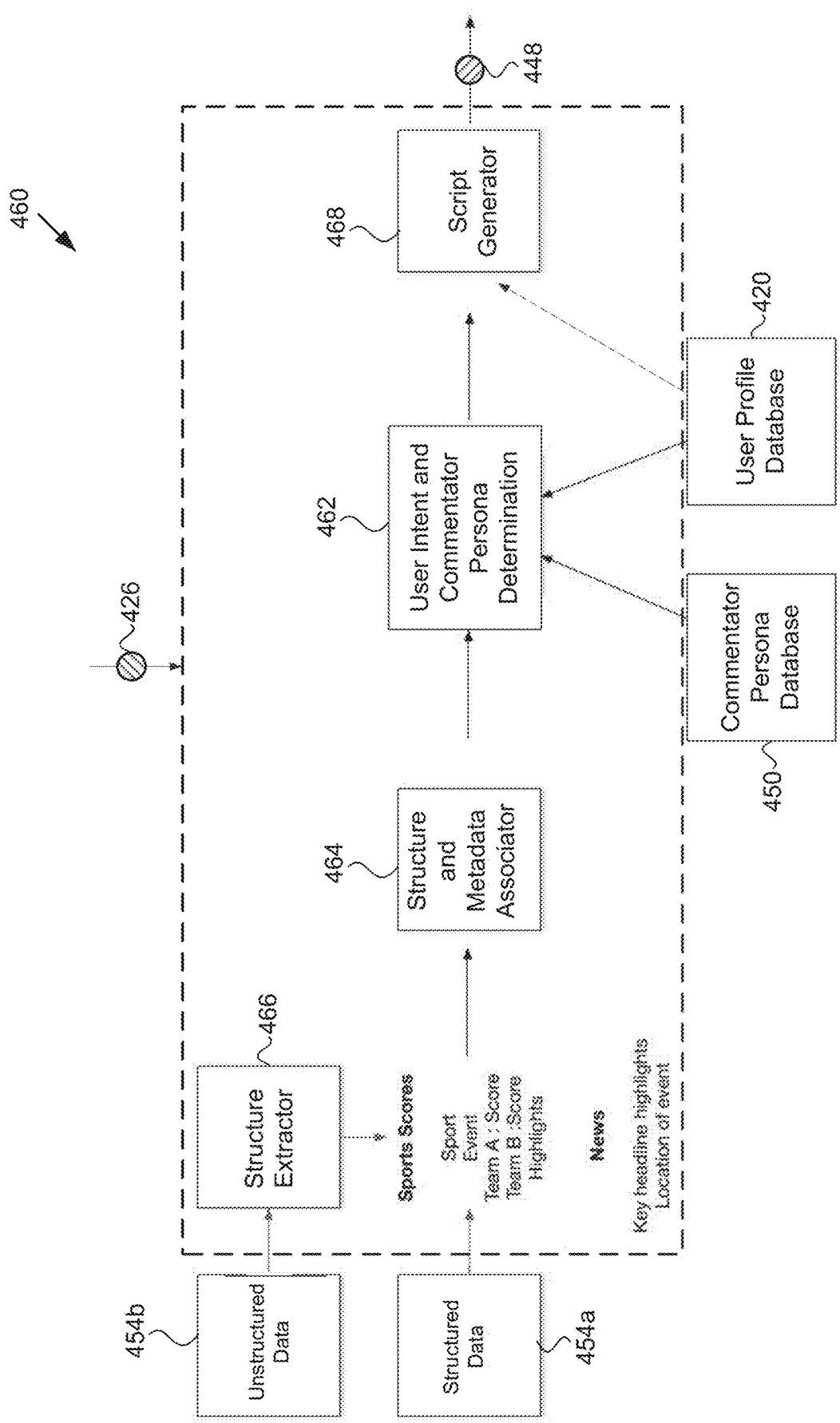
FIG. 4 is a diagram depicting a commentator-specific script pipeline implemented by software code executed by the systems in FIGS. 1 and 3, according to one implementation.

FIG. 4 is a diagram of exemplary commentator-specific script pipeline 460 implemented by custom commentary software code 110, in FIG. 1, or by custom commentary software code 310, in FIG. 3, and suitable for use by system 100 or user system 300 to generate commentator-specific or user-commentator-specific scripts, according to one implementation. As shown in FIG. 4, commentator-specific script pipeline 460 is configured to receive input data 426, to obtain content data in the form of one or more of structured data 454*a* and unstructured data 454*b*, and to provide commentary 448 as an output. As further shown in FIG. 4, commentator-specific script pipeline 460 includes user intent and commentator persona determination block 462, structure and metadata associator block 464, structure extractor block 466, and script generator block 468. Also shown in FIG. 4 are user profile database 420 and commentator persona database 450.

Input data 426, structured data 454*a*, unstructured data 454*b*, user profile database 420, commentator persona database 450, and commentary 448 correspond respectively in general to input data 126, structured data 154*a*, unstructured data 154*b*, user profile database 120, commentator persona database 150, and commentary 148, in FIG. 1. Consequently, input data 426, structured data 454*a*, unstructured data 454*b*, user profile database 420, commentator persona database 450, and commentary 448 may share any of the characteristics attributed to respective input data 126, structured data 154*a*, unstructured data 154*b*, user profile database 120, commentator persona database 150, and commentary 148 by the present disclosure, and vice versa. That is to say, like commentary 148, commentary 448 may be based on a commentator-specific or user-commentator-specific script generated by custom commentary software code 110, executed by processing hardware 104 of computing platform 102, or by custom commentary software code 310, executed by processing hardware 304 of user system 300.

Figure 5:
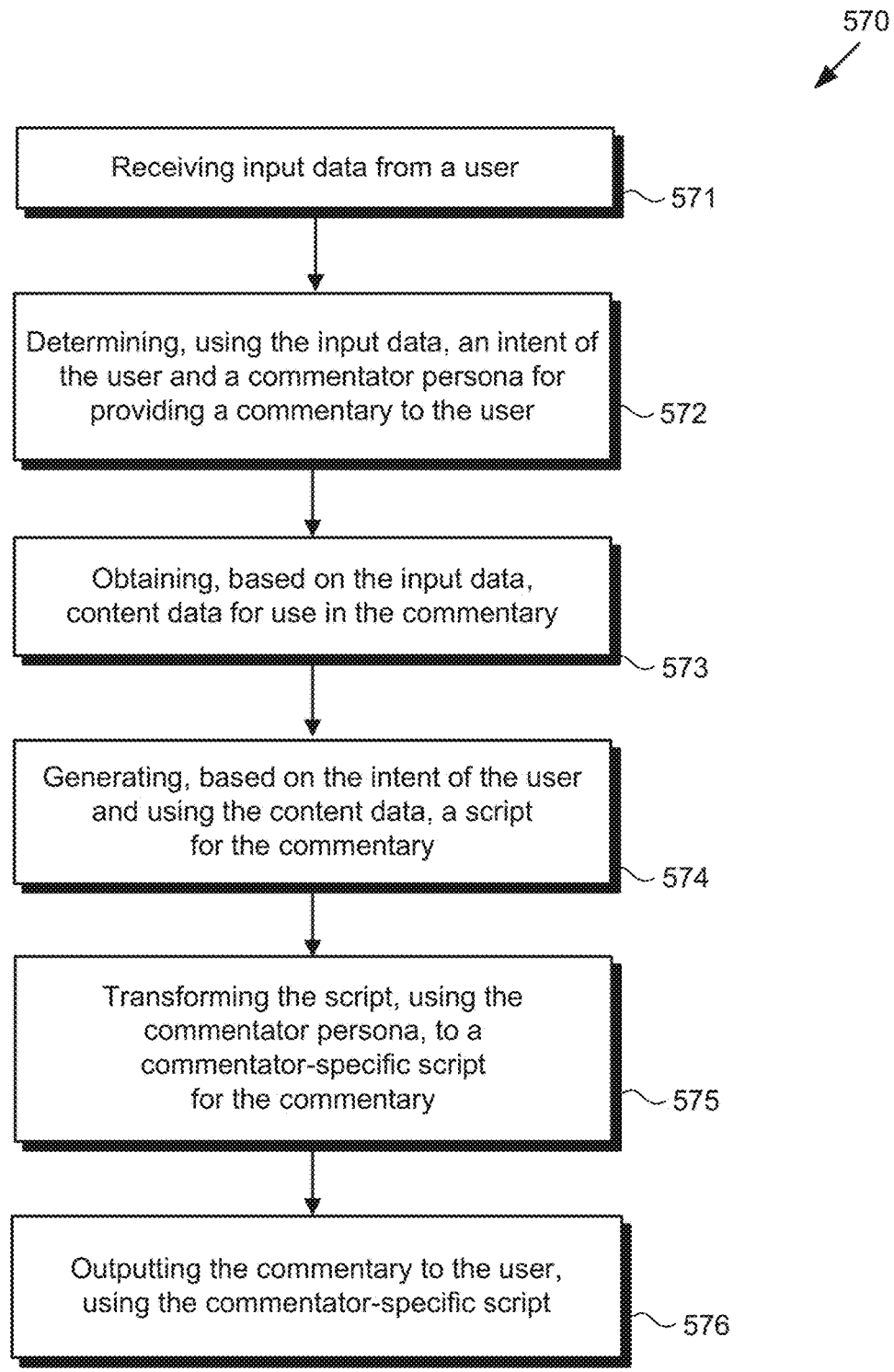
FIG. 5 shows a flowchart presenting an exemplary method for automating generation of commentator-specific scripts, according to one implementation.

The operation of commentator-specific script pipeline 460 implemented by custom commentary software code 110, custom commentary software code 310, or both custom commentary software code 110 and custom commentary software code 310, will be further described by reference to FIG. 5. FIG. 5 shows flowchart 570 presenting an exemplary method for automating generation of commentator-specific scripts, according to one implementation. With respect to the action outlined in FIG. 5, it is noted that certain details and features have been left out of flowchart 570 in order not to obscure the discussion of the inventive features in the present application.

Referring to FIG. 5 in combination with FIGS. 1, 2A, 3, and 4 flowchart 570 begins with receiving input data 126/426 from user 118/318 (action 571). Input data 126/426 may be received by processing hardware 104 of system 100, via input unit 130/230, or by processing hardware 304 of user system 300 via input unit 130/230. Input data 126/426 may be received in the form of verbal and non-verbal expressions by user 118 in interacting with social agent 116*a* or 116*b*, for example. As noted above, the term non-verbal expression may refer to vocalizations that are not language based, i.e., non-verbal vocalizations, as well as to physical gestures and physical postures. Examples of non-verbal vocalizations may include a sigh, a murmur of agreement or disagreement, or a giggle, to name a few. Alternatively, input data 126/426 may be received as speech uttered by user 118/318, or as one or more manual inputs to input device 132/232 in the form of a keyboard or touchscreen, for example, by user 118/318. Thus, input data 126/426 may describe one or more of data entry by user 118/318, speech by user 118/318, a non-verbal vocalization by user 118/318, a facial expression by user 118/318, a gesture by user 118/318, or a physical posture of user 118/318.

According to various implementations, system 100, user system 300, or both system 100 and user system 300, advantageously include(s) input unit 130/230, which may obtain video and perform motion capture, using camera(s) 234*e* for example, in addition to capturing audio using microphone(s) 235. As a result, input data 126/426 from user 118/318 may be conveyed to commentator-specific script pipeline 460 implemented by custom commentary software code 110/310. Custom commentary software code 110/310, when executed by respective processing hardware 104/304, may receive audio, video, and motion capture features from input unit 130/230, and may detect a variety of verbal and non-verbal expressions by user 118/318 in an interaction by user 118/318 with system 100 or user system 300. It is noted that in addition to identifying features of an interaction by user 118/318 with system 100 or user system 300, input data 126/426 may also identify a user profile of user 118/318, such as user profile 122*a*/322, for example.

Flowchart 570 further includes determining, using input data 126/426, an intent of user 118/318 and a commentator persona for providing a commentary to user 118/318 (action 572). For example, based on an input to input device 132/232, or a verbal expression, a non-verbal expression, or a combination of verbal and non-verbal expressions described by input data 126/426, processing hardware 104 may execute custom commentary software code 110, or processing hardware 304 may execute custom commentary software code 310, to determine the intent of user 118/318, and in some use cases, the commentator persona for providing commentary to user 118/318.

As noted above, as defined in the present application, the term "intent" refers to a goal oriented psychological state of user 118/318. Examples of the types of goals determining intent include the acquisition of information, engaging in supportive dialogue, or engaging in debate, to name a few. In some use cases, the intent of user 118/318 may be determined based on the subject matter of the interaction described by input data 126/426. Moreover, in some use cases, user 118/318 may expressly state, or enter using input device 132/232: "I wish to receive sports or news or weather commentary from media personality "A," thereby enabling custom commentary software code 110/310 to determine the commentator persona for providing the commentary to user 118/318.

It is noted that, in some implementations, action 572 may further include identifying a sentiment of user 118/318. As noted above, as defined in the present application, the term "sentiment" refers to the present psychological state of user 118/318. As also noted above, the term sentiment may include partisanship, favoritism, impartiality, dislike, or opposition, to name a few examples. In various implementations, the sentiment of user 118/318 may be identified using input data 126/426 received in action 571, using user profile 122*a*/322 of user 118/318, or using both.

With regard to the sentiment of user 118/318, it is further noted that in some implementations, the commentator persona determined in action 572 for providing the commentary to user 118/318 may be determined so as to be either supportive or adversarial to the sentiment of user 118/318. For example, where user 118/318 is a fan or partisan of sports team "A," the commentator persona determined in action 572 may be determined so as also to be a partisan of sports team "A" (i.e., supportive to the sentiment of user 118/318), or to be a partisan of rival sports team "B" (i.e., adversarial to the sentiment of user 118/318).

In some implementations, the commentator persona determined in action 572 may be determined by inference based on the subject matter of the interaction described by input data 126/426, based on one or both of the age or gender of user 118/318, or both. Alternatively, or in addition, the commentator persona may be determined based on a preference of user 118/318 that is predicted or inferred by system 100 from user profile 122*a*/322 of user 118/318. Action 572 may be performed by custom commentary software code 110, executed by processing hardware 104, or by custom commentary software code 310, executed by processing hardware 304, and using user intent and commentator persona determination block 462 of commentator-specific script pipeline 460.

Flowchart 570 further includes obtaining, based on input data 426/426, content data 154 for use in the commentary (action 573). Content data 154 may include one or more of structured data 154*a*/454*a* and unstructured data 154*b*/454*b*. Unstructured data 154*b*/454*b* may include video coverage or a news article, for example, describing an event, from which data such as the identity of principle participants, dates, times, sports scores, weather information, or other specific data can be extracted. By contrast, structured data 154*a*/454*a* may include data files containing data that has previously been extracted from other sources.

Content data 154 may also include metadata that characterizes one or both of structured data 154*a*/454*a* and unstructured data 154*b*/454*b*, or provides context for one or both of structured data 154*a*/454*a* and unstructured data 154*b*/454*b*. By way of example, content data 154 including a news story may include metadata describing the story as a tragedy, an ironic outcome, or an event to be celebrated. Analogously, content data 154 including a weather report may include metadata characterizing the report as a watch or warning, such as a tornado or hurricane watch or warning. As yet another example, content data including a sports report by may describe the report as "good news for fans of team 'A'," or in a playoff scenario, "bad news for other playoff hopeful competitors of team 'B'."

Action 573 may be performed by custom commentary software code 110, executed by processing hardware 104, or by custom commentary software code 310, executed by processing hardware 304, and using structure and metadata associator block 464, and, in some implementations, structure extractor block 466 of commentator-specific script pipeline 460.

Flowchart 570 further includes generating, based on the intent of user 118/318 determined in action 572 and using the content data obtained in action 573, a script for the commentary to be provided to user 118/318 (action 574). As noted above, the intent of user 118/318 may be determined using input data 126/426. For example, where user 118/318 requests a sports commentary directed to a game played by team "A" earlier in the day, the script generated in action 574 may include generic language for conveying a game report using the content data obtained in action 574.

As noted above, in some implementations, action 572 may include identifying a sentiment of user 118/318. In those implementations, action 574 may further include generating the script for the commentary based at least in part on that sentiment of user 118/318. Furthermore, in some implementations, action 574 may include anticipating a future action by user 118/318. In those implementations, action 574 may further include generating the script for the commentary based at least in part on the anticipated future action by user 118/318. For example, where input data 126/426 or user profile 122a/322 of user 118/318 indicates that user 118/318 has tickets to attend a sporting event including sports team "C," as well as favorite sports team "A" of user 118/318, the script generated in action 574 may include a reference to sports team "C" or one or more of its players even when sports team "C" and its players lack direct relevance to the commentary being provided. Action 574 may be performed by custom commentary software code 110, executed by processing hardware 104, or by custom commentary software code 310, executed by processing hardware 304, and using script generator block 468 of commentator-specific script pipeline 460.

Flowchart 570 further includes transforming the script generated in action 574, using the commentator persona determined in action 572, to a commentator-specific script for the commentary (action 575). As discussed above, the feature "commentator-specific script" refers a set of instructions for providing commentary to user 118/318 based at least on the intent of user 118/318, the commentator persona to be projected by system 100 or user system 300 while delivering the commentary, and in some implementations, the sentiment of user 118/318. For example, a commentator-specific script may employ language using the specific words, phrases, sentence structures, and prosody characteristic of the commentator persona providing the commentary. Action 574 includes transformation of the generic language script generated in action 574 to a script using language and other forms of expression that are characteristic of, identifiable with, and in some use cases, idiosyncratic to a fictional character, or a real person, such as a media personality. Action 575 may be performed by custom commentary software code 110, executed by processing hardware 104, or by custom commentary software code 310, executed by processing hardware 304, and using script generator block 468 of commentator-specific script pipeline 460.

Flowchart 570 further includes outputting commentary 148/448 to user 118/318, using the commentator-specific script (action 576). In some implementations, action 576 may include rendering the commentary to an output device including an audio speaker or a display. For example, in some implementations, action 576 may include rendering the commentary to speaker(s) 244, to display 108/208/308, or to audio speaker(s) 244 and display 108/208/308. In some implementations, commentary 148/448 may be rendered as text on display 108/208/308. In addition, or alternatively, commentary 148/448 may be rendered as one or more of disembodied speech using audio speaker(s) 244 alone, or as speech by an avatar or animated character assuming the character persona determined in action 572.

Furthermore, and as shown in FIG. 1, in some implementations, system 100 may include social agent 116b in the form of a robot or other machine capable of simulating expressive behavior and including output unit 140/240. In those implementations, commentary 148/448 may be rendered to such a machine configured to instantiate social agent 116b assuming the commentator persona determined in action 572. It is noted that in various implementations, commentary 148/448, output in action 576, may include one or more of speech by the commentator persona determined in action 572, a non-verbal vocalization by that commentator persona, a facial expression by that commentator persona, a gesture by that commentator persona, or a physical posture of that commentator persona.

According to some implementations, commentary 148/448 output in action 576 may include a dialogue by the commentator persona with user 118/318. In other implementations, system 100 or user system 300 may be configured to project multiple character personas concurrently. In some of those implementations, commentary 148/448 output in action 576 may include a dialogue among the commentator persona determined in action 572 and one or more other commentator personas. Action 576 may be performed by custom commentary software code 110, executed by processing hardware 104 of system 100, or by custom commentary software code 310, executed by processing hardware 304 of user system 300.

In some implementations, custom commentary software code 110, executed by processing hardware 104, or custom commentary software code 310, executed by processing hardware 304, to obtain information relating to user 118/318, such as information from user profile 122a/322 of user 118/318, for example, to transform the commentator-specific script using that information relating to user 118/318 to a user-commentator-specific script for commentary 128/448. In those implementations, custom commentary software code 110, executed by processing hardware 104, or custom commentary software code 310, executed by processing hardware 304, may output commentary 148/448 to user 118/318, using the user-commentator-specific script.

For example, custom commentary software code 110, executed by processing hardware 104, or custom commentary software code 310, executed by processing hardware 304, may determine one or both of the age or gender of user 118/318 as based on sensor data gathered by input unit 130/230. In those implementations, transforming the commentator-specific script in action 576 may also use the age of user 118/318, the gender of user 118/318, or the age and gender of user 118/318 to personalize the user-commentatorspecific script. For example, the commentator persona determined in action 572 may typically utilize different words, phrases, or speech patterns when interacting with users with different attributes, such as age, gender, and express or inferred preferences. As another example, some expressions typically used by the determined character persona may be deemed too sophisticated to be appropriate for use in interactions with children.

Thus, the present application discloses automated systems and methods for automating generation of commentator-specific scripts. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
one or more sensors;
a processing hardware; and
a memory storing a software code;
the processing hardware configured to execute the software code to:
receive input data from a user, wherein the input data comprises sensor data acquired via the one or more sensors;
determine, using the input data, an intent of the user, a sentiment of the user, and a commentator persona for providing a commentary to the user, wherein the commentator persona is based on the sentiment;
obtain, based on the input data, content data for use in the commentary, the content data including metadata characterizing the content data;
generate, based on the intent of the user and using the content data, a script for the commentary;
transform the script, using the commentator persona, to a commentator-specific script employing one or more of a specific non-verbal vocalization, facial expression, gesture, or physical posture characteristic of the commentator persona that is based on the sentiment; and
output the commentary to the user, using the commentator-specific script, by: (a) instantiating a social agent assuming the commentator persona as a virtual character rendered on a display of the system, or (b) instantiating the social agent as a robot.

2. The system of claim 1, wherein the processing hardware is further configured to execute the software code to:
transform the commentator-specific script, using information relating to the user, to a user-commentator-specific script for the commentary; and
wherein outputting the commentary to the user uses the user-commentator-specific script.

3. The system of claim 1, wherein the input data received from the user includes a non-verbal expression that comprises at least one of a physical gesture, a physical posture, a sigh, a murmur, or a giggle.

4. The system of claim 1, wherein the commentator persona is supportive of the sentiment or adversarial to the sentiment.

5. The system of claim 1, wherein the processing hardware is further configured to execute the software code to:
anticipate a future action by the user; and
wherein the script for the commentary is generated based at least in part on the future action.

6. The system of claim 1, further comprising a plurality of commentator personas including the commentator persona, and wherein the commentary includes a dialogue among the commentator persona and at least one other commentator persona of the plurality of commentator personas.

7. The system of claim 1, wherein the processing hardware is further configured to execute the software code to transform the script, using the commentator persona, to the commentator-specific script further employing a specific word, phrase, sentence structure, or prosody characteristic of the commentator persona.

8. The system of claim 1, wherein transforming the script, using the commentator persona, to the commentator-specific script employs the specific non-verbal vocalization characteristic of the commentator persona.

9. The system of claim 1, wherein the intent, the sentiment, and the commentator persona are determined using one or more trained machine learning models.

10. A method for use by a system that comprises one or more sensors, a processing hardware, and a memory storing a software code, the method comprising:
receiving, by the software code executed by the processing hardware, input data from a user, wherein the input data comprises sensor data acquired via the one or more sensors;
determining, by the software code executed by the processing hardware and using the input data, an intent of the user, a sentiment of the user, and a commentator persona for providing a commentary to the user, wherein the commentator persona is based on the sentiment;
obtaining, by the software code executed by the processing hardware based on the input data, content data for use in the commentary, the content data including metadata characterizing the content data;
generating, by the software code executed by the processing hardware based on the intent of the user and using the content data, a script for the commentary;
transforming the script, by the software code executed by the processing hardware and using the commentator persona, to a commentator-specific script employing one or more of a specific non-verbal vocalization, facial expression, gesture, or physical posture characteristic of the commentator persona that is based on the sentiment; and
outputting the commentary to the user, by the software code executed by the processing hardware, using the commentator-specific script, by: (a) instantiating a social agent assuming the commentator persona as a virtual character rendered on a display of the system, or (b) instantiating the social agent as a robot.

11. The method of claim 10, further comprising:
transforming the commentator-specific script, by the software code executed by the processing hardware and using information relating to the user, to a user-commentator-specific script for the commentary; and
wherein outputting the commentary to the user, by the software code executed by the processing hardware, uses the user-commentator-specific script.

12. The method of claim 10, wherein the input data received from the user includes a non-verbal expression that comprises at least one of a physical gesture, a physical posture, a sigh, a murmur, or a giggle.

13. The method of claim 10, wherein the commentator persona is supportive of the sentiment or adversarial to the sentiment.

14. The method of claim 10, further comprising:
anticipating, by the software code executed by the processing hardware, a future action by the user; and
wherein the script for the commentary is generated based at least in part on the future action.

15. The method of claim 10, wherein the system further comprises a plurality of commentator personas including the commentator persona, and wherein the commentary includes a dialogue among the commentator persona and at least one other commentator persona of the plurality of commentator personas.

16. The method of claim 10, wherein transforming the script, using the commentator persona, to the commentator-specific script employs the specific non-verbal vocalization characteristic of the commentator persona.

17. A system comprising:
one or more sensors;
a processing hardware; and
a memory storing a software code;
the processing hardware configured to execute the software code to:
receive input data from a user, wherein the input data comprises sensor data acquired via the one or more sensors;
determine, using the input data, an intent of the user, a sentiment of the user, and a commentator persona for providing a commentary to the user;
obtain, based on the input data, content data for use in the commentary, the content data including metadata characterizing the content data;
generate, based on the intent of the user and using the content data, a script for the commentary;
transform the script, using the commentator persona, to a commentator-specific script employing a specific word or phrase characteristic of the commentator persona providing the commentary to the user that is based on the sentiment; and
output the commentary to the user, using the commentator-specific script, by: (a) instantiating a social agent assuming the commentator persona as a virtual character rendered on a display of the system, or (b) instantiating the social agent as a robot;
wherein the input data received from the user includes comprises a non-verbal expression being at least one of a physical gesture, a physical posture, a sigh, a murmur, or a giggle.

18. The system of claim 17, wherein transforming the script, using the commentator persona, to the commentator-specific script to generate the commentary, further employs a specific non-verbal vocalization characteristic of the commentator persona.

* * * * *